United States Patent
Park et al.

(10) Patent No.: US 6,763,181 B1
(45) Date of Patent: *Jul. 13, 2004

(54) OPTICAL DISK RECORDING/ REPRODUCING APPARATUS AND METHOD THEREOF

(75) Inventors: Pan-gie Park, Suwon (KR); Young-nam Oh, Sungnam (KR); Tae-yun Chung, Gwachun (KR); Jung-suk Kang, Seoul (KR); Seong-Jin Moon, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/313,375

(22) Filed: May 18, 1999

(30) Foreign Application Priority Data

Jun. 27, 1998 (KR) .............................. 98-24554

(51) Int. Cl.[7] .......................... H04N 5/76; H04N 5/781
(52) U.S. Cl. ...................................... 386/105; 125/106
(58) Field of Search ............................... 386/125, 111, 386/112, 46, 94, 109, 124, 105, 106, 52, 55, 1, 4, 45, 40; 360/15, 13; H04N 5/76, 5/781

(56) References Cited

U.S. PATENT DOCUMENTS

| 4,926,272 | A | | 5/1990 | Takamatsu et al. |
| 5,703,997 | A | | 12/1997 | Kitamura et al. |
| 5,742,569 | A | | 4/1998 | Yamamoto et al. |
| 5,751,371 | A | | 5/1998 | Shintani ..................... 348/564 |
| 5,784,528 | A | | 7/1998 | Yamane et al. |
| 5,870,523 | A | | 2/1999 | Kikuchi et al. |
| 5,960,152 | A | * | 9/1999 | Sawabe et al. |
| 6,078,727 | A | | 6/2000 | Saeki et al. ................. 386/125 |
| 6,289,166 | B1 | | 9/2001 | Uno et al. ..................... 386/46 |
| 6,393,196 | B1 | | 5/2002 | Yamane et al. |

FOREIGN PATENT DOCUMENTS

| EP | 0 737 980 A2 | 10/1996 |
| EP | 0 808 072 A2 | 11/1997 |
| EP | 0 903 738 A2 | 3/1999 |
| EP | 0 929 072 A2 | 7/1999 |
| EP | 0 942 426 A2 | 9/1999 |
| JP | 6-89544 | 3/1994 |
| JP | 07-284064 | 10/1995 |
| JP | 9-259506 | 3/1996 |
| JP | 10-125006 | 10/1996 |
| JP | 8-339194 | 12/1996 |
| JP | 10-92158 | 1/1997 |
| JP | 9-82070 | 3/1997 |

(List continued on next page.)

OTHER PUBLICATIONS

U.S. patent application Ser. No. 09/610,378, Park et al., filed Jul. 5, 2000.
U.S. patent application Ser. No. 09/610,698, Park et al., filed Jul. 5, 2000.

*Primary Examiner*—Robert Chevalier
(74) *Attorney, Agent, or Firm*—Staas & Halsey LLP (57) ABSTRACT

An apparatus and method for recording and reproducing audio and video data in real time on a rewritable optical disk, and a disk recording medium allowing a user to access recorded data at predetermined intervals. The disk recording medium includes cells having part of predetermined data and set as reproduction and recording units, and information on a position from the start of the cells to a specific position. The method includes forming a cell of part of the recorded audio and video data, forming a program of the one or more cells, forming a part of title (PTT) of a specific portion of the recorded audio and video data, and then forming the information on the cell, the program, and the PTT on the disk.

36 Claims, 5 Drawing Sheets

FOREIGN PATENT DOCUMENTS

| | | |
|---|---|---|
| JP | 9-231726 | 9/1997 |
| JP | 9-251763 | 9/1997 |
| JP | 9-259505 | 10/1997 |
| JP | 10-27461 | 1/1998 |
| WO | WO 97/06531 | 2/1997 |
| WO | WO 97/46007 | 12/1997 |
| WO | 98/13769 | 4/1998 |
| WO | WO 98/44508 | 10/1998 |
| WO | WO 99/38166 | 7/1999 |

* cited by examiner

| PGCN | Program Chain number |
|------|----------------------|
| PGN  | Program Number       |

| C_N | CELL NUMBER |
|---|---|
| OFFSET_TM | OFFSET TIME IN CELL |

FIG. 7

OPTICAL DISK RECORDING/ REPRODUCING APPARATUS AND METHOD THEREOF

CROSS-REFERENCE TO RELATED APPLICATIONS

This application is based upon and claims priority of Korean Patent Application No. 98-24554, filed Jun. 27, 1998, in the Korean Patent Office, the disclosure of which is incorporated herein by reference.

BACKGROUND OF THE INVENTION

1. Field of the Invention

The present invention relates to an optical disk recording/reproducing apparatus and a method thereof, and, more particularly, the present invention relates to an apparatus for and method of recording/reproducing audio and video data on a re-recordable optical disk in real time.

2. Description of the Related Art

Figure 1:
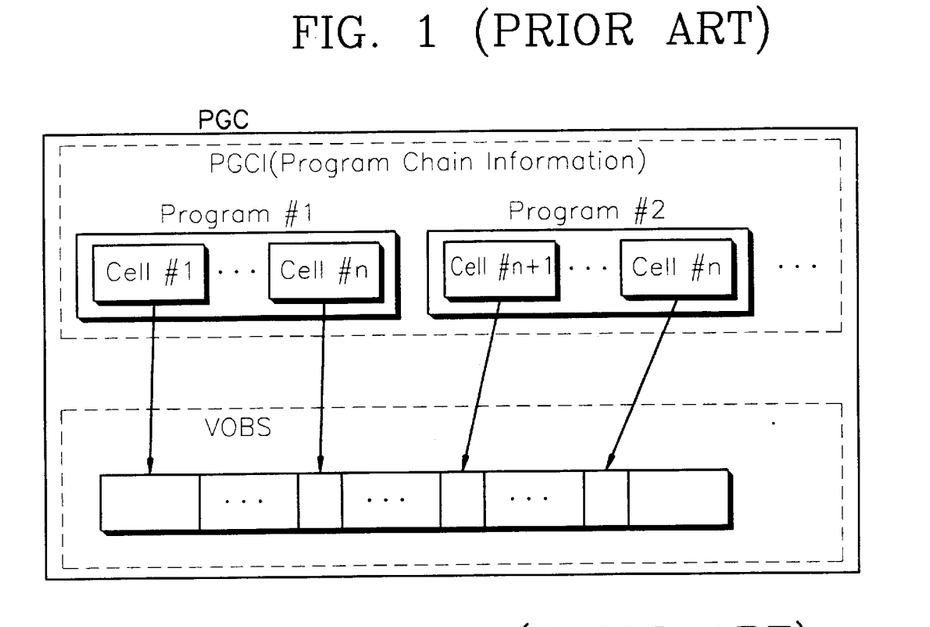
FIG. 1 is a block diagram illustrating a relationship between a program chain (PGC), programs, cells, and video objects (VOBS) in a prior art DVD-ROM video format.

A typical digital video disk (DVD) read only memory (ROM) video player reproduces audio and video data using a disk. FIG. 1 is a diagram of a conventional DVD-ROM video format. As shown in FIG. 1, the conventional DVD-ROM video format is comprised of a program chain (PGC) including programs, cells for logically dealing with data, and video objects (VOBS) in which audio and video data are recorded.

If a movie has been recorded into first and second volumes, the entire movie is represented by a PGC, and each of the first and second volumes can be represented by programs. Furthermore, each of the programs can be divided into several smaller units (i.e., cells) in consideration of a random access, and data included in each cell exists in a partial area of the VOBS.

A manufacturer of a disk in the DVD-ROM video format produces original audio and video data items in the form of PGCs, including the programs and the cells, and provides the result to users.

As shown in FIG. 1, program chain information (PGCI) is the connection information of several programs, and VOBS is a video object (VOB) collection in which actually-compressed audio and video data items have been recorded. One or more programs exist in one PGCI, and one program is comprised of a collection of one or more cell units. Each cell is a type of recording/reproducing unit, and audio and video data exit in the VOBS. The PGCI includes only program information, such as the position of audio and video data or the recording/reproducing time existing in the VOBS. The VOB in the VOBS is subdivided into video object units (VOBU) which are used as random access units of a disk recording/reproducing apparatus. In general, the VOBU consists of motion picture experts group (MPEG) video data and audio data multiplexed in units of a sector.

Figure 2A:
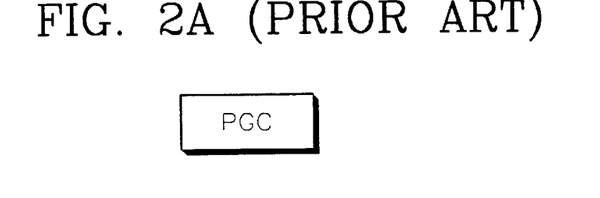
FIGS. 2A and 2B are block diagrams illustrating a relationship between a title and a PGC in a prior art DVD-ROM video format.
Figure 2B:
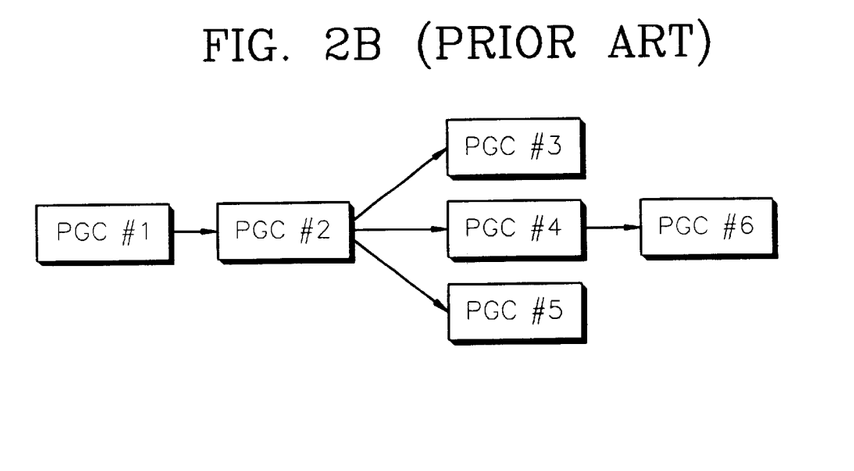

The relationship between the title and the PGC in a conventional DVD-ROM video disk will now be described. For example, a title can correspond to an entire movie, and is the largest unit of a data structure from a user's standpoint. When manufacturing the DVD-ROM video disk with such a title, a data structure is formed wherein one title may comprise one PGC, as shown in FIG. 2A, or one title may comprise several PGCs as shown in FIG. 2B, according to the manufacturer's intention. When the title comprising several PGCs, as shown in FIG. 2B, is reproduced in sequence, PGC#1 and PGC#2 are reproduced, then one of PGC#3, PGC#4, and PGC#5 is selected and reproduced, and finally PGC#6 is reproduced. The contents of PGC#3, PGC#4, and PGC#5 may be different. Alternatively, PGC#3, PGC#4 and PGC#5 may have different editions of the same content.

From a user's standpoint, the title has such a large concept that it can be divided into several chapters or parts of title (PTT) to allow a scene to rapidly jump to the next scene. In the case of a music compact disk (CD), an entire album recorded in the CD corresponds to one title, and each of the songs corresponds to a chapter or PTT. The programs and cells are reproduction and recording units determined by a user according to the properties of data. In the PGC corresponding to a title concept, the PTT is divided by the content of data and logically provided to the user.

Figure 3:
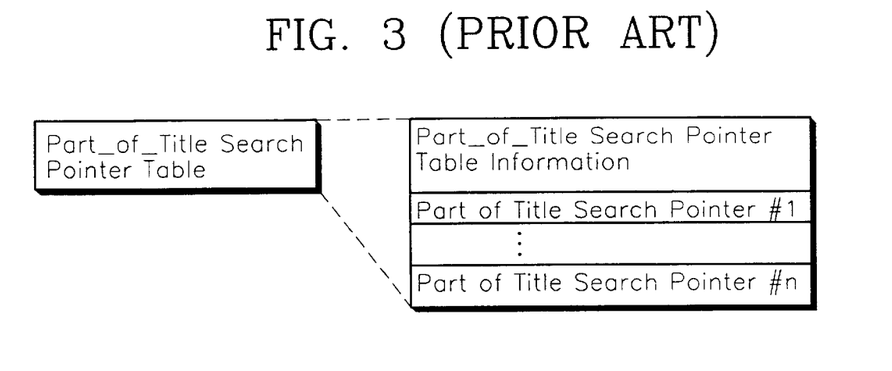
FIG. 3 is a diagram of a prior art part of title (PTT) search pointer table.
Figure 4:
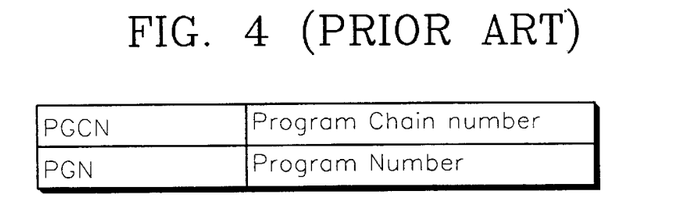
FIG. 4 is a diagram of a prior art PTT search pointer.

The PTT also has its own information in the form of a PTT search pointer table among areas of information on the title. FIG. 3 illustrates a conventional PTT search pointer table. As shown in FIG. 3, the conventional PTT search pointer table is comprised of a PTT search pointer table information area, and PTT search pointers existing in a title. In FIG. 3, the PTT search pointer table information area includes information on the number of PTT search pointers. Each of the PTT search pointers indicates a point in time when a PTT starts, and, as shown in FIG. 4, is comprised of a program chain number (PGCN) and a program number (PGN). The PGCN represents the number of a program chain (PGC) to which the PTT pertains, and the PGN represents the number of a program in the PGC. A large amount of PTT information is moved from a current position, where PTT information is being reproduced, to the next PTT, and then is reproduced, when a user has received the next PTT command via an external input device.

In the DVD-ROM video format, the programs making up a PGC, as shown in FIG. 1, are consistent with the content actually recorded on a disk. That is, an area in a specific range includes programs through a special manufacturing process on the basis of the contents recorded on the disk, and a specific program can be defined to be selected from the several programs and used as PTT. Further, the program units are divided in accordance with the contents of recorded data, so that the PTT information can use the program units. However, in an apparatus for recording/reproducing audio and video data in real time, units such as programs, cells, etc., cannot be produced in accordance with the contents of data recorded on a disk, unless special information on the contents of the recorded data is provided in real time. Therefore, if the PTT is produced according to the prior art, the PTT information is meaningless to users.

SUMMARY OF THE INVENTION

It is an object of the present invention to solve the above-noted problems of the prior art and to provide an optical disk recording and reproducing method of recording and reproducing part of title (PTT) information depending on real-time recorded data contents on a rewritable optical disk.

It is another object of the present invention to provide an optical disk recording and reproducing apparatus for recording and reproducing part of title (PTT) information depending on real-time recorded data contents on a rewritable optical disk.

It is still another object of the present invention to provide an optical disk recording medium by which a user can randomly access part of title (PTT) information within specific units, such as cells or programs, for reproduction and recording on a rewritable optical disk.

Objects and advantages of the present invention are achieved with an optical disk recording method of recording audio and video data on a rewritable disk in real time, comprising the steps of: recording the audio and video data in a specific area on the disk; forming a cell with a part of the recorded audio and video data; forming a program with the cell; forming a part of title (PTT) with a specific portion of the recorded audio and video data; and recording information on the formed cell, program, and PTT on the disk.

The step of forming a cell may comprise forming a plurality of cells and the step of forming a program comprises forming a program with the plurality of cells.

The step of forming the cell may comprise forming the cell based on a recording start and a recording end command from a user.

The step of forming the program may comprise forming the program based on the recorded information on the cell.

The step of forming the PTT may comprise forming the PTT at a regular reproducing time interval with reference to a time for reproducing the cells.

The disk recording method may further comprise the step of randomly accessing the PTT within a specific unit of a data structure for reproduction or recording. The specific unit of the data structure for reproduction or recording may be the cell. The specific unit of the data structure for reproduction or recording may be the program.

Objects and advantages of the present invention are achieved in accordance with embodiments of the present invention with an optical disk reproducing method of reproducing previous and next units of a specific unit on a rewritable disk in real time, the method comprising the steps of: reading and decoding a video object unit (VOBU) including a specific unit for reproducing, prior to reading and decoding other units, in response to input of a key for reproducing the previous and next units of the specific unit; and displaying decoding data on a screen in response to the decoding data arriving at the specific position for reproducing in the specific unit during decoding.

Objects and advantages of the present invention are achieved in accordance with embodiments of the present invention with an optical recording/reproducing apparatus for recording and reproducing audio and video data on a rewritable disk, comprising: a key input unit to input commands for reproducing previous and next data of a specific unit; and a controller to control recording of information on the disk about a cell including part of the audio and video data, a program including the cell, and a part of title (PTT) including a specific portion of the audio and video data, reading and decoding a video object unit (VOBU) including the specific unit for reproducing prior to recording and decoding other units, and displaying of the decoding data on a screen when the decoding data arrives at the specific position for reproducing in the specific unit during decoding.

Objects and advantages of the present invention are achieved in accordance with embodiments of the present invention with a disk recording medium to access recorded data at predetermined intervals, comprising: a cell including part of predetermined data, the cell being set as reproduction and recording units; and information representing a position from a start of the cell to a specific position.

The disk recording medium may further comprise a plurality of cells including part of predetermined data, the plurality of cells being set as reproduction and recording units, wherein the information represents a position from a start of the respective cells to the specific position.

The reproduction and recording units may be randomly accessible. Further, the position from the start of the respective cells to a specific position is defined as a reproduction time.

Objects and advantages of the present invention are achieved in accordance with embodiments of the present invention with an optical disk recording/reproducing apparatus for recording and reproducing audio and video data on a rewritable disk, comprising a key input unit to receive a command key for recording a part of title (PTT) at a specific position during recording of audio and video data; and a controller to control storage of PTT information representing a specific position being reproduced at a point in time when the command key is input from the key input unit, and to control recording of reproduction-completed PTT information on the disk.

The information representing the specific position being reproduced may include information on a predetermined unit used during reproduction at the specific position, and offset position information within the predetermined unit.

The offset position information may be a reproduction time from a start of the predetermined unit to the specific position.

Objects and advantages of the present invention are achieved in accordance with embodiments of the present invention with an optical disk reproducing method of reproducing a previous and a next unit of a specific unit on a rewritable disk in real time, the method comprising reading and decoding a video object unit (VOBU) including a specific unit for reproducing, prior to reading and decoding other units, in response to input of a key for reproducing the previous and next units of the specific unit; and displaying decoding data on a screen in response to the decoding data arriving at a specific position for reproducing the specific unit during the decoding.

Objects and advantages of the present invention are achieved in accordance with embodiments of the present invention with an optical disk recording/reproducing method of recording and reproducing audio and video data on a rewritable disk, the method comprising setting a specific position while recorded audio and video data is reproduced; storing information on the specific position in a separate area; and and recording the information on the specific position on the rewritable disk.

The information on the specific position may include information on a predetermined unit used during reproduction at the specific position, and information on an offset position within the predetermined unit.

The information on the offset position may be a reproduction time from a start of the predetermined unit to the specific position.

BRIEF DESCRIPTION OF THE DRAWINGS

The above and other objects and advantages of the present invention will become more apparent and more readily appreciated from the following description of the preferred embodiments, taken in conjunction with the accompanying drawings in which.

DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Figure 5:
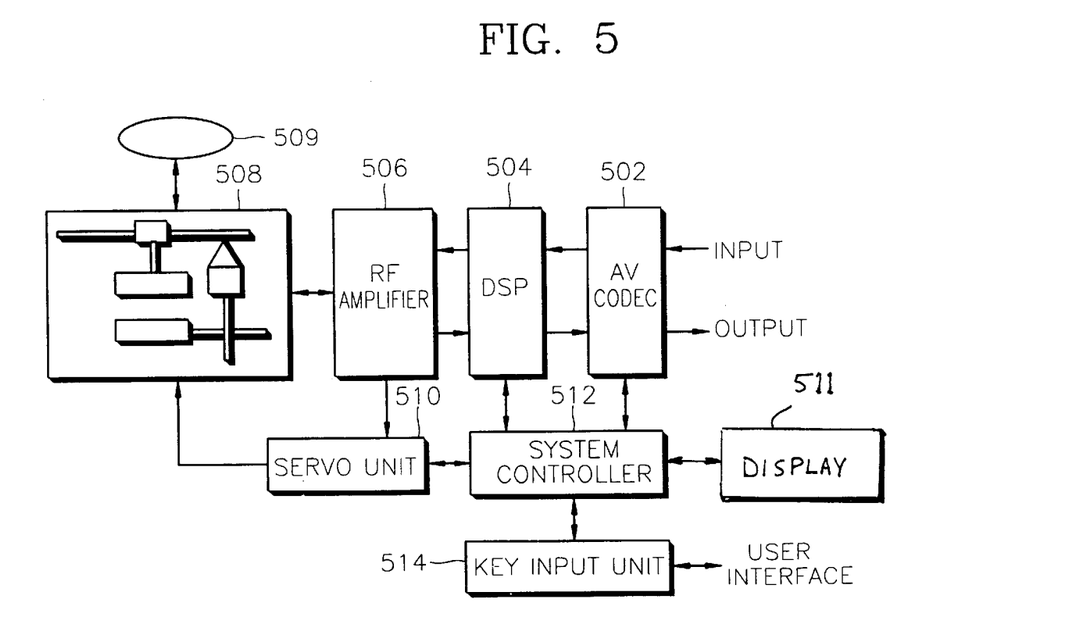
FIG. 5 is a block diagram of an optical disk recording/reproducing apparatus for providing PTT information according to the present invention.

FIG. 5 is a block diagram of an optical disk recording/reproducing apparatus in accordance with embodiments of the present invention. The operation of the optical disk recording/reproducing apparatus shown in FIG. 5 in a recording mode and a reproducing mode will now be described below.

In the recording mode, an audio/video (AV) codec 502 compresses and encodes input external audio and video data in predetermined units according to a predetermined compression encoding system, and simultaneously provides information such as the size of audio and video data encoded by the predetermined units, or the time for reproduction. A digital signal processor (DSP) 504 adds additional data for error correction code (ECC) to the data encoded by the AV codec 502, modulates the resultant data, and outputs the result.

An RF amplifier 506 amplifies the data input from the DSP 504 and converts the amplified data into an optical signal. A pick-up unit 508 includes an actuator, and records the output optical signal of the RF amplifier 506 on a disk 509. A servo unit 510 receives information necessary for servo control from the DSP 504 via the RF amplifier 506 and a system controller 512, and performs a stable servo function for the pick-up unit 508. The system controller 512 controls the whole system, generates logical information such as programs or cells with respect to data to be recorded, and receives start position information of PTT desired by a user via a key input unit 514, or generates PTT information using an arbitrary method and controls the received or generated PTT information to be recorded on the disk 509 via the DSP 504, the RF amplifier 506, and the pick-up unit 508. The system controller 512 also controls display of data relating to the PTT, such as decoding data, on a display 511.

In the reproducing mode, the pick-up unit 508 in the reproduction mode reads data stored on the disk 509 and outputs the read data as an optical signal. The RF amplifier 506 converts the optical signal output by the pick-up unit 508 to an electrical signal, extracts modulated data, and generates a servo signal for performing a stable servo function using the electrical signal. The DSP 504 demodulates the modulated data of the RF amplifier 506, and removes additional data while correcting errors by performing ECC. The servo unit 510 performs a stable servo function using a servo signal generated by the RF amplifier 506. The AV codec 502 decodes audio and video data compressed and coded by the DSP 504. The system controller 512 controls the pick-up unit 508, the RF amplifier 506, the DSP 504, and the AV codec 502 according to a command input by a user via the key input unit 514. Particularly, when a command "next/previous PTT" is input, the system controller 512 controls the pick-up unit 508, the RF amplifier 506, the DSP 504, and the AV codec 502 to reproduce the PTT, corresponding to the input command.

Figure 6:
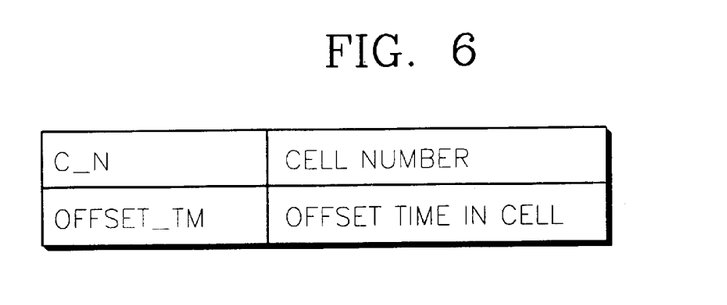
FIG. 6 is a detailed view of a PTT search pointer according to the present invention.

FIG. 6 is a detailed view of a PTT search pointer in accordance with embodiments of the present invention. The PTT search pointer is part of the PTT search pointer information, and, for example, may be part of part of title (PTT) search pointer table as shown in FIG. 3. The PTT search pointer is comprised of C_N representing a cell number in a program chain (PGC), and OFFSET_TM representing reproduction time information from the start position of a cell to a specific position indicated by the PTT. In accordance with the embodiment of the invention shown in FIG. 6, the reproduction time information is represented in the form of an hour/minute/second frame on the basis of video data. Thus, in accordance with the present invention, the PTT is a structure which can designate a specific area in a cell which belongs to the PGC. This is advantageous because the configurations of cells and programs in a general optical disk recording/reproducing apparatus are not consistent with the contents of recorded data, and because the configuration of the cells may be too long in some cases.

Accordingly, while the PTT is reproduced, the PTT is randomly accessed within specific units, such as the cells and programs, used in the data structure for reproduction and recording.

Figure 7:
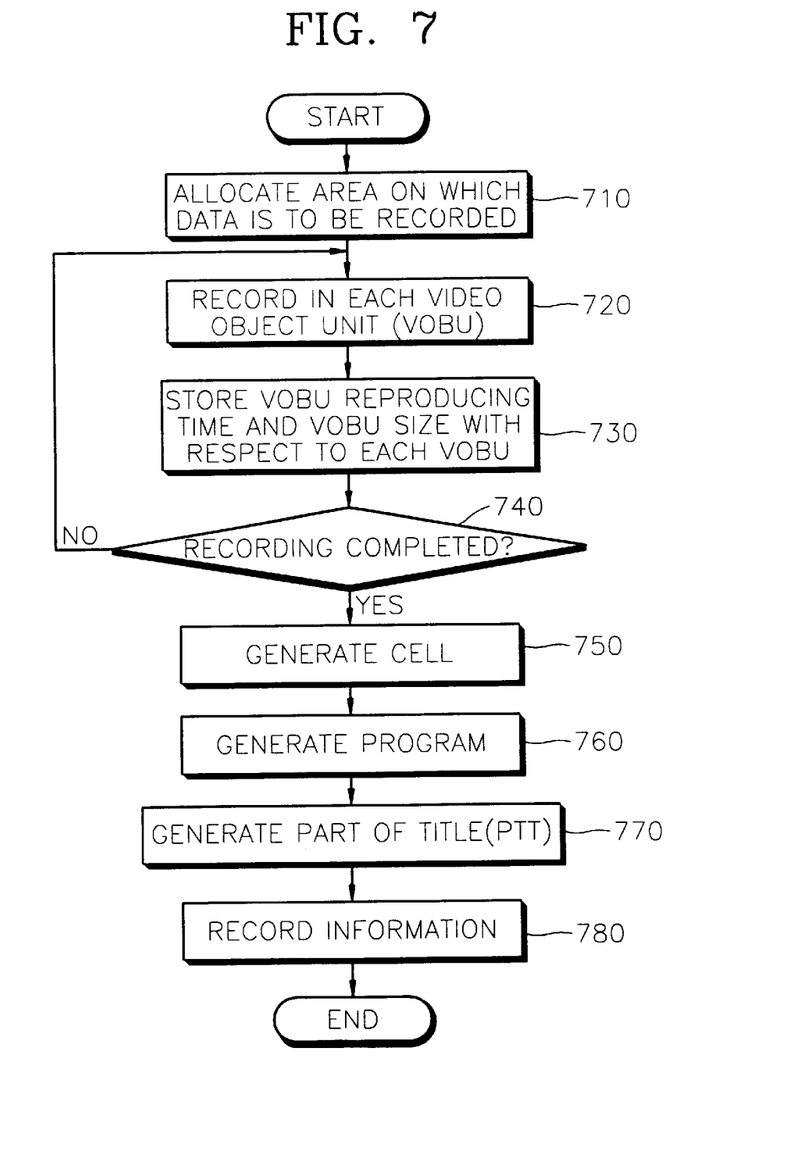
FIG. 7 is a flowchart illustrating an optical disk recording method of recording PTT information according to the present invention.

A method of recording PTT information on an optical disk under the control of the system controller 512 of FIG. 5 will now be described with reference to FIG. 7.

Initially, in step 710, a physical area on a disk, on which data is to be recorded, is previously allocated so as to use an area unoccupied by data. Next, in step 720, input external audio and video data are recorded in video object units (VOBU). A video object (VOB) comprises the video object units (VOBU).

In step 730, information, such as the size of each of the recorded VOBUs and the time for reproducing the VOBU, is stored in a special memory. Continuing, in step 740, it is determined whether recording is completed.

When all recording is completed, in step 750, a cell is generated with a part of audio and video data using the information such as the VOBU size and the reproducing time of the VOBU stored in the special memory. Continuing, in step 760, a program is generated with one or more cells, and, in step 770, a PTT is generated with a specific portion of the audio and video data. Finally, in step 780, the cell, the program, and the PTT information are recorded on the disk.

The program, the cell and the PTT information can also be generated using information individually received from a user. However, the program, cell and PTT information are generally arbitrarily generated in a disk recording apparatus to avoid inconvenience to users and to save time.

The cell can be formed in various manners. For example, the cell can be comprised of the start and end of a recording command input by a user via the key input unit 514 of FIG. 5. The program can also can be formed in various manners. For example, the program can be comprised of cells recorded on the same date. The PTT information includes the contents of FIGS. 3 and 6, and can be configured at intervals of a predetermined reproducing time, taking into consideration the time for reproducing the configured cells.

Figure 8:
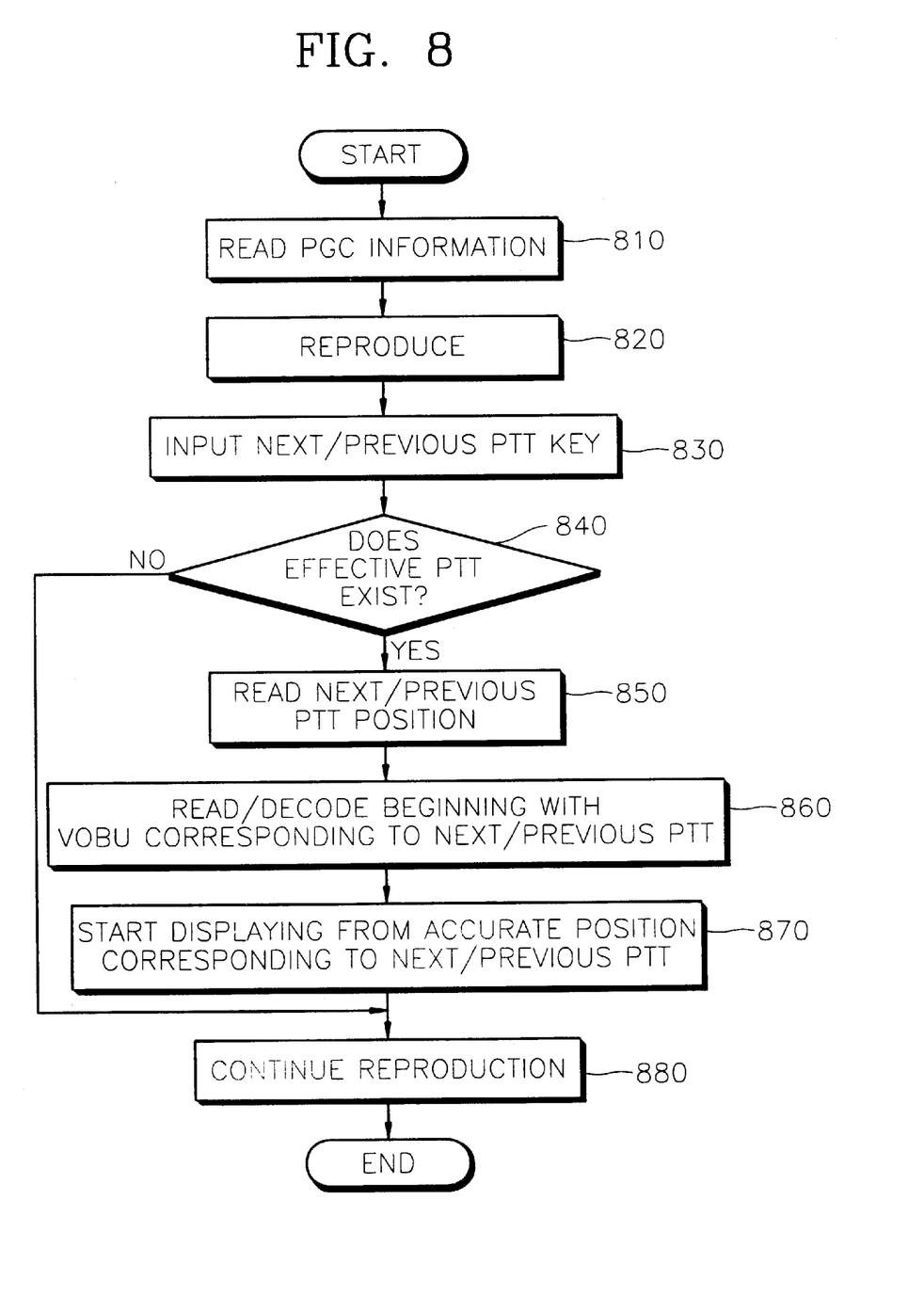
FIG. 8 is a flowchart illustrating an optical disk reproducing method of searching PTT information according to the present invention.

A PTT searching process performed by the system controller 512 of FIG. 5 during reproduction of an optical disk will now be described with reference to the flowchart of FIG. 8.

First, in step 810, the system controller 512 reads PGC information from a memory (not shown) to receive a user command from a user interface and to start reproduction. In step 820, an optical disk is reproduced using the PGC information.

Next, in step 830, in response to a "next/previous PTT" command key input by a user during reproduction of the optical disk, a determination as to whether effective PTT information exists is performed in step 840. The determination as to whether effective PTT information exists is performed in step 830 because while the last or first PTT in a current PGC is being reproduced, PTT information corresponding to the next/previous PTT command cannot be dealt with.

In step 850, if it has been determined in step 840 that effective PTT exists, the next/previous PTT position information, as shown in FIG. 6, is read. In step 860, a VOBU, being the minimum unit in recording, corresponding to the next/previous PTT is read and decoded.

The position of the next/previous PTT is not generally consistent with the position of the VOBU. Accordingly, when the position of the VOBU becomes an accurately desired PTT position, the decoded data is displayed on a screen in step 870. Reproduction continues in step 880.

A PTT position recording method performed by the system controller 512 of FIG. 5 will now be described with reference to the flowchart of FIG. 9.

Figure 9:
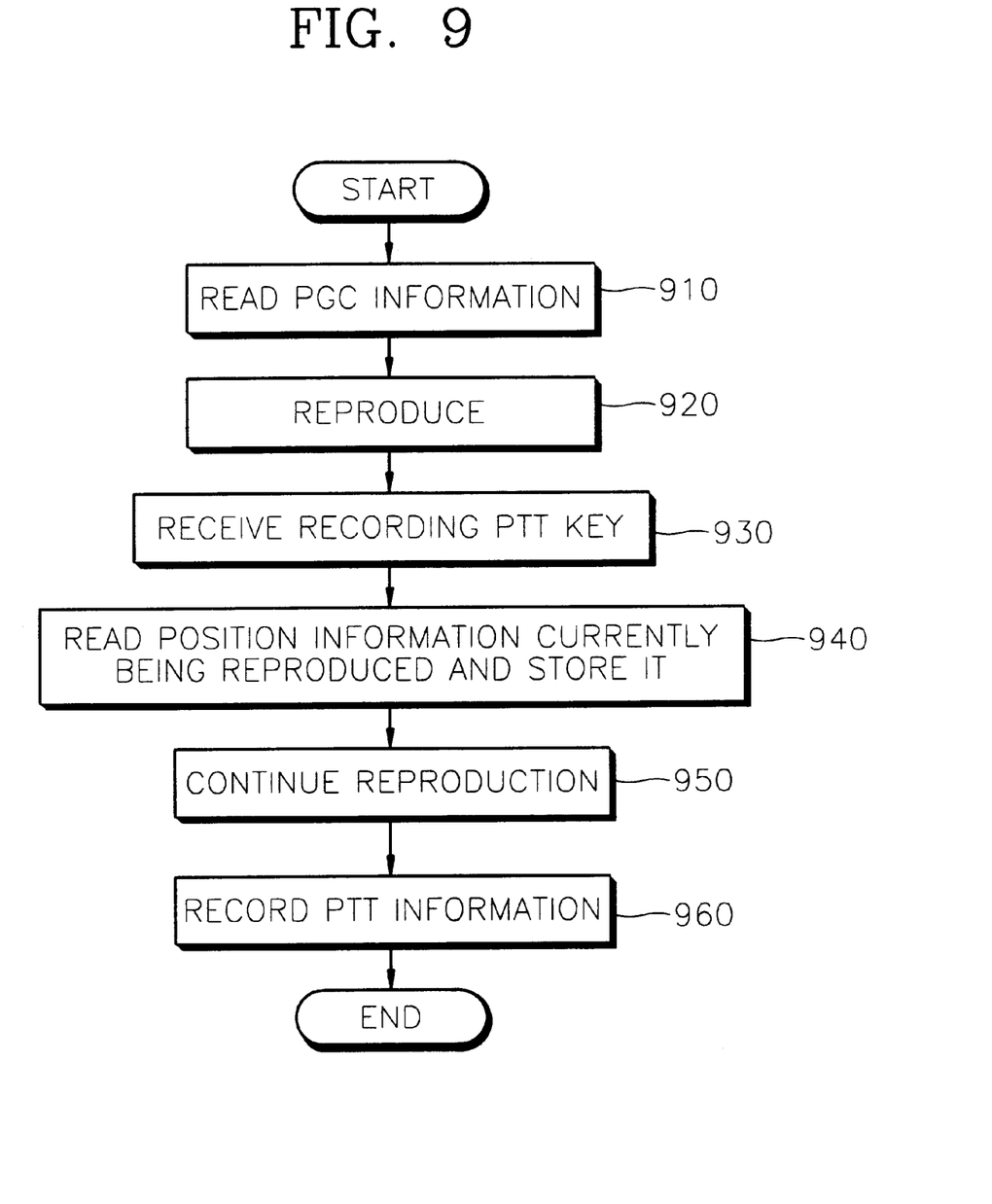
FIG. 9 is a flowchart illustrating an optical disk recording method of recording the positions of PTT according to the present invention.

As shown in FIG. 9, first, in step 910, when reproduction through a user interface with a user starts, the system controller 512 reads PGC information from a memory (not shown). Then, in step 920, an optical disk is reproduced using the PGC information.

In step 930, a user inputs a recording PTT key during reproduction. A position currently being reproduced at the point of time when the recording PTT key is input in step 930 is understood as the cell number in the PGC and the offset reproducing time information in the cell, as shown in FIG. 6. In step 940, the position information currently being reproduced is read and stored in a separate memory (not shown). Reproduction continues in step 950. After the reproduction is completed, in step 960, stored PTT information is recorded on the optical disk.

According to the present invention, audio and video data can be recorded/reproduced on/from a rewritable optical disk in real time by providing PTT information that is consistent with recorded data contents. Also, a user can randomly access a PTT within specific units for reproduction and recording.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. An optical disk recording method of recording audio and/or video data on a rewritable disk in real time, comprising:

recording the audio and/or video data in a specific area on the disk;

forming a cell with a part of the recorded audio and/or video data;

forming a program with the cell;

forming a part of title (PTT) with a specific portion of the recorded audio and video data; and recording information on the formed cell, program, and PTT on the disk.

2. The disk recording method as claimed in claim 1, wherein the forming of the cell comprises forming a plurality of cells and the forming of the program comprises forming the program with the plurality of cells.

3. The disk recording method as claimed in claim 1, wherein the forming of the cell comprises forming the cell based on a recording start and a recording end command from a user.

4. The disk recording method as claimed in claim 1, wherein the forming of the program comprises forming the program based on the recorded information on the cell.

5. The disk recording method as claimed in claim 1, wherein the forming of the PTT comprises forming the PTT at a regular reproducing time interval with reference to a time for reproducing the cell.

6. The disk recording method as claimed in claim 5, further comprising randomly accessing the PTT within a specific unit of a data structure for reproduction or recording.

7. The disk recording method as claimed in claim 6, wherein the specific unit of the data structure for reproduction or recording is the cell.

8. The disk recording method as claimed in claim 6, wherein the specific unit of the data structure for reproduction or recording is the program.

9. An optical disk reproducing method of reproducing a previous and/or a next unit of a specific unit on a rewritable disk in real time, the method comprising:

reading and decoding a video object unit (VOBU) including the specific unit for reproducing, in response to input of a key for reproducing the previous and/or next unit of the specific unit; and displaying decoding data on a screen in response to the decoding data arriving at a specific position for reproducing the specific unit during the decoding.

10. An optical disk recording/reproducing method of recording and reproducing audio and/or video data on a rewritable disk, the method comprising:

setting a specific position of the audio and/or video data currently being reproduced while the audio and/or video data which has been recorded on the rewritable disk is being reproduced;

storing information on the specific position in a separate area of the rewritable optical disk; and recording the information on the specific position on the rewritable disk.

11. The optical disk recording/reproducing method as claimed in claim 10, wherein the information on the specific position includes information on a predetermined unit used during reproduction at the specific position, and information on an offset position within the predetermined unit.

12. The optical disk recording/reproducing method as claimed in claim 11, wherein the information on the offset position is a reproduction time from a start of the predetermined unit to the specific position.

13. The disk recording method as claimed in claim 1, wherein:

the recording of the audio and/or video data comprises
      allocating an area on the disk for the recording of the audio and/or video data,
      recording the audio and/or video data on the rewritable disk in video object units,
      storing a size of each video object unit and a time for reproducing each video object unit; and the forming of the cell comprises
  generating the cell with the part of the recorded audio and/or video data using the size of each video object unit and the time for reproducing each video object unit.

14. The disk recording method as claimed in claim 1, wherein the forming of the cell, the program, and the PTT comprise generating the cell, the program and the PTT, respectively, based upon inputs received from a user.

15. The disk recording method as claimed in claim 1, wherein the forming of the cell, the program, and the PTT comprise generating the cell, the program and the PTT, respectively, arbitrarily.

16. The disk recording method as claimed in claim 2, wherein the forming of the program comprises forming the program with the cells which are recorded on a same date.

17. The disk recording method as claimed in claim 2, wherein the PTT is recorded at predetermined intervals of a reproducing time, taking into account reproducing times of the cells.

18. The disk recording method as claimed in claim 1, further comprising:
  determining whether the recording of the audio and/or video data is completed prior to forming the cell, the program, and the PTT; and
  forming the cell, the program, and the PTT after determining that the recording of the audio and/or video data is completed.

19. A method of recording audio and/or video data on a rewritable recording medium, comprising:
  recording the audio and/or video data on the recording medium;
  forming a cell for logically dealing with the recorded audio and/or video data;
  forming a part of title pointer including information indicating a specific area in the cell; and
  recording the cell and the part of title pointer on the recording medium.

20. A method of recording audio and/or video data on a rewritable recording medium, comprising:
  recording the audio and/or video data on the recording medium;
  forming a cell for logically dealing with the audio and/or video data;
  forming a part of title pointer including information indicating a specific area in the cell;
  recording the cell and the part of title pointer on the recording medium;
  forming a plurality of cells including the cell, for logically dealing with the audio and/or video data;
  forming a program with the plurality of cells; and
  forming title information including a value indicating a number of part of title pointers including the part of title pointer, cell numbers of the cells and offset positions indicating specific area in the corresponding cells.

21. The method as claimed in claim 20, wherein the offset positions indicate positions from starts of the cells to corresponding specific positions in the cells.

22. The method as claimed in claim 21, wherein the offset positions are defined by reproduction times from the start positions to the specific positions of the corresponding cells.

23. The optical disk reproducing method as claimed in claim 9, further comprising:
  determining whether effective part of title information exists on the recording medium, wherein the effective part of title information indicates a specific area of a cell, and the specific unit is the part of title information;
  reading the previous or next part of title information if the effective part of title information exists; and
  the reading and decoding of the VOBU occurs only if the effective part of title information exists.

24. The optical disk reproducing method as claimed in claim 23, further comprising:
  reading program chain information to receive a user command to start reproduction prior to determining whether the effective part of title information exists.

25. The optical disk reproducing method as claimed in claim 23, wherein the effective part of title information comprises a cell number and an offset position from a start of the cell to a specific position in the cell.

26. The optical disk reproducing method as claimed in claim 25, wherein the offset position comprises a value defined by a reproduction time from the start position to the specific position.

27. The optical disk recording/reproducing method as claimed in claim 10, wherein the recording of the information on the specific position occurs after completion of the reproduction of the audio and/or video data.

28. The optical disk recording/reproducing method as claimed in claim 11, wherein the predetermined unit is a cell for logically dealing with the audio and/or video data.

29. The optical disk recording/reproducing method as claimed in claim 11, further comprising:
  reading program chain information and starting reproduction of the audio and/or video data using the program chain information, prior to setting of the specific position.

30. The optical disk recording/reproducing method as claimed in claim 10, wherein the setting of the specific position comprises receiving an input from a user at the specific position of reproduction.

31. A method of reproducing audio and/or video data from a rewritable recording medium having the audio and/or video data on the recording medium, a cell for logically dealing with the audio and/or video data, a part of title pointer including information indicating a specific area in the cell, the method comprising:
  reading the part of title pointer based upon an input from user; and
  randomly accessing the audio and/or video data based upon the information indicating the specific area after a start in the cell.

32. A method of reproducing audio and/or video data from a rewritable recording medium having the audio and/or video data on the recording medium, a cell for logically dealing with the audio and/or video data, a part of title pointer including information indicating a specific area in the cell, the method comprising:
  reading the part of title pointer based upon an input from user; and
  randomly accessing the audio and/or video data based upon the information indicating a specific area in the cell,
  wherein the information indicating a specific area in the cell comprises offset data relating to a position from a start of the cell to the specific position.

33. The method as claimed in claim 32, wherein the offset data represents a reproduction time from the start of the cell to the specific position.

34. An optical disk recording and/or reproducing method of recording audio and/or video data on a recordable disk in real time comprising:

recording the audio and/or video data in a specific area on the disk;

forming cells, each cell formed with a part of the recorded audio and/or video data, forming programs, each program formed with the one or more cells, and recording information on the formed cells and programs on the disk; and forming a part of title (PTT) in a specific position while the audio and/or video data which has been recorded on the disk is being reproduced, and recording information on the part of title (PTT) on the disk.

35. The optical disk recording and/or reproducing method as claimed in claim 34, wherein the formed part of title (PTT) is stored in a separate memory.

36. The optical disk recording and/or reproducing method as claimed in claim 34, wherein the formed part of title (PTT) is recorded on the disk after recording of the audio and/or video data.

* * * * *